United States Patent Office 3,271,452
Patented Sept. 6, 1966

3,271,452
4-ALKOXY-4'-SECONDARY-ALKYLAMINO-
DIPHENYL-AMINES
Paul L. Merz, Livermore, Calif., assignor to United States Rubber Company, New York, N.Y., a corporation of New Jersey
No Drawing. Filed Nov. 19, 1962, Ser. No. 238,784
4 Claims. (Cl. 260—571)

This invention relates to new chemical compounds which are useful for protecting organic materials which are normally subject to oxidative deterioration, such as edible fats and oils, gasoline, and particularly vulcanized rubber, from deterioration by the oxygen in the air. Further, these compounds are extremely effective in protecting vulcanized rubber against ozone cracking.

The new chemical compounds are 4-alkoxy-4'-mono-secondary-alkylaminodiphenylamines, which may be represented by the formula

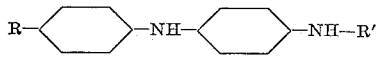

in which R is an alkoxy group having 1 to 4 carbon atoms and R' is a secondary alkyl group having 3 to 8 carbon atoms. Examples of the chemicals of the present invention are 4-methoxy-4'-isopropylaminodiphenylamine,
4-ethoxy-4'-isopropylaminodiphenylamine,
4-ethoxy-4'-(4-methylpent-2-ylamino) diphenylamine,
4-ethoxy-4'-(2-octylamino) diphenylamine and
4-isopropoxy-4'-isopropylaminodiphenylamine.

It is known that conventional rubber vulcanizates suffer from three serious types of degradation: (a) bulk oxidation; (b) surface oxidation; and (c) ozone cracking.

Bulk oxidation is characterized by a slow decrease in tensile strength of the vulcanizate and a change in the ultimate elongation and in the modulus of elasticity without any apparent surface change. It is conveniently measured by observing changes in these bulk properties following accelerated aging in air or oxygen at elevated temperatures. Surface oxidation is the rapid light-catalyzed oxidation of the vulcanizate to yield a hard, inelastic, but flexible surface with shallow grooves. The bulk properties (tensile and modulus) are unaffected. The third type of degradation, ozone cracking, is also a surface phenomenon; however, it is not an oxidative but rather on ozonolysis phenomenon. Although there are only a few parts of ozone present per hundred million parts of air, this small amount of ozone is sufficient to cause the formation of deep cracks in stressed rubber vulcanizates exposed to the atmosphere. Unfortunately, most commercially available antioxidants offer little or no protection against ozone cracking. Accordingly, a principal object of the present invention is to provide a rubber vulcanizate that is more effectively protected against ozone cracking as well.

The rubber stock to which the antioxidant and antiozonant compounds of the present invention are added may be any sulfur-vulcanizable rubber which is ordinarily subject to attack by oxygen and ozone. The rubbers may be natural (Hevea) rubber or synthetic rubbers or mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2=C<$ group where at least one of the disconnected valences is attached to an electro-negative group, that is, a group which substantially increases the electrical dissymmetry or polar character of the molecule. Examples of such monoethylenic compounds which are copolymerizable with butadienes-1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. Natural rubber and such synthetic rubbers may be designated by the term diolefin polymer rubbers. Generally, from about 0.1 to 5 parts, by weight, of the chemicals of the invention per 100 parts of the diolefin polymer rubber will be employed to stabilize against attack by oxygen and ozone. As antioxidants for gasoline, generally 0.0001 to 0.05 percent of the chemical based on the weight of the gasoline will be used. As antioxidants for fats and oils, generally 25 to 2500 parts of the chemical per million parts by weight of the fats and oils will be used.

The chemicals of the present invention may be readily prepared by the reductive alkylation of the selected 4-alkoxydiphenylamine having a primary amino, nitro or nitroso group in the 4' position with the selected ketone having 3 to 8 carbon atoms, and hydrogen, in the presence of any of the customary hydrogenation catalyst such as copper chromite, platinum, palladium and nickel. The 4-alkoxy-4'-nitrodiphenylamine may be prepared by condensing p-chloronitrobenzene with the selected p-alkoxyaniline or suitable derivative thereof such as the N-formyl or N-acetyl compound. The 4-alkoxy-4'-nitrosodiphenylamine may be prepared by nitrosating the selected 4-alkoxydiphenylamine followed by Fischer-Hepp rearrangement of the N-nitroso derivative to give the 4-alkoxy-4'-nitrosodiphenylamine. The 4-alkoxy-4'-nitrodiphenylamine and the 4-alkoxy-4'-nitrosodiphenylamine may be reduced to the 4-alkoxy-4'-aminodiphenylamine before reductive alkylation.

The following examples illustrate the preparation and use of the compounds of the present invention. All parts and percentages referred to herein are by weight.

*Example 1.—4-ethoxy-4'-isopropylamino-diphenylamine*

Into a 2-liter 3-necked flask equipped with a thermometer, stirrer, Stark and Dean trap filled with benzene, and reflux condenser were charged 236 grams of p-chloronitrobenzene, 327, grams of formo-p-phenetidide, 150 grams of potassium carbonate and 150 ml. of dimethylformamide. The reaction mixture was refluxed for 5½ hours on a Wood's metal bath (140–160° C.). The water formed was collected in the Stark and Dean trap. The reaction mixture was cooled to 100° C. and poured into 3 liters of hot water. The resulting precipitate was triturated first with hot dilute hydrochloric acid and then with 1:4 benzene-hexane. The product was recrystallized from ethanol to give pure 4-ethoxy-4'-nitrodiphenylamine in 41% yield; melting point, 131–132° C.

Analysis.—Calculated for $C_{14}H_{14}N_2O_3$: C, 65.10; H, 5.46; N, 10.85. Found: C, 65.15; H, 5.51; N, 10.76.

Into a 1.7-liter rocking autoclave were charged 100 grams of the 4-ethoxy-4'-nitrodiphenylamine, 500 ml. of acetone and 3 grams of 5% palladium on carbon. The contents while agitated were subjected to 300–500 pounds per square inch pressure (p.s.i.) of hydrogen at 25–70° C. until the calculated amount of hydrogen was absorbed; this required about 6 hours. The hydrogenated charge was removed from the autoclave and filtered. The solvent was evaporated from the filtrate and the residue vacuum distilled. The 4-ethoxy-4'-isopropylaminodiphenylamine fraction boiling at 197–200° C. (0.4 mm.) was collected; it weighed 73 grams.

Analysis.—Calculated for $C_{17}H_{22}N_2O$: C, 75.51; H, 8.20; N, 10.36. Found: C, 75.78; H, 8.03; N, 10.33.

*Example 2.—4-ethoxy-4'-(2-octylamino) diphenylamine*

Into a 1.7-liter rocking autoclave were charge 101 grams of 4-ethoxy-4'-nitrodiphenylamine, 400 ml. of 2-octanone and 5 grams of 5% palladium on carbon. The contents while agitated were subjected to 300–500 p.s.i. of hydrogen at 25–115° C. for 3 hours. The workup was similar to that used in Example 1. The 4-ethoxy-4'-(2-octylamino)diphenylamine fraction boiling at 212–220° C. (0.2 mm.) was collected; it weighed 95.5 grams.

Analysis.—Calculated for $C_{22}H_{32}N_2O$: C, 77.60; H, 9.47; N, 8.23. Found: C, 77.62; H, 9.56; N, 8.40.

*Example 3.—4-ethoxy-4'-(4-methylpent-2-ylamino)diphenylamine*

In a 1.7-liter rocking autoclave were charged 160 grams of 4-ethoxy-4'-nitrodiphenylamine, 640 ml. of methtyl isobutyl ketone and 8 grams of 5% palladium on carbon. The contents while agitated were subjected to 300–500 p.s.i. of hydrogen at 25–75° C. for 1¼ hours and at 75° C. for 6 hours. The workup was similar to that used in Example 1. The 4-ethoxy-4'-(4-methylpent-2-ylamino)diphenylamine fraction boiling at 217–220° C. (1.0 mm.) was collected; it weighed 132 grams.

Analysis.—Calculated for $C_{20}H_{28}N_2O$: C, 76.87; H, 9.03; N, 8.97. Found: C, 77.18; H, 9.10; N, 9.10.

*Example 4.—4-methoxy-4'-isopropylaminodiphenylamine*

4-methoxy-4'-nitrodiphenylamine was prepared by heating 471 grams of p-chloronitrobenzene, 739 grams of p-anisidine, 290 grams of potassium carbonate, 11.4 grams of cuprous iodide and 146 grams of dimethylformamide. The product was catalytically hydrogenated in ethanol at 150° C. and 400 p.s.i. of hydrogen using 5% palladium on carbon as catalyst to give the desired 4-methoxy-4'-aminodiphenylamine which after recrystallization from ethanol melted at 101–102° C. Into a 1-liter rocking autoclave were charged 53.5 grams of this intermediate, 70 ml. of acetone and 0.6 gram of 5% palladium on carbon. The contents while agitated were subjected to 100–200 p.s.i. of hydrogen at 130–135° C. for 2 hours and to 400–540 p.s.i. of hydrogen at 150–155° C. for 2¼ hours. The work-up was similar to that used in Example 1. The 4-methoxy-4'-isopropylaminodiphenylamine fraction boiling at 180–188° C. (0.6 mm.) was collected. Gas chromatography showed this material to be virtually pure.

*Example 5.—4-isopropoxy-4'-isopropylaminodiphenylamine*

Into a 1-liter 3-necked flask were charged 175 grams of solvent naphtha, 50 grams of benzene, 75 grams of water, 113 grams of 4-isopropoxydiphenylamine and 36.8 grams of sodium nitrite. To the stirred mixture was added slowly 82.5 grams of 35% sulfuric acid at 25–35° C. The mixture was stirred for 1 hour, 500 ml. of benzene added and the aqueous layer withdrawn. To the stirred organic layer was added at 25° C. during 1½ hours a solution of 33.5 grams of anhydrous hydrogen chloride in 60 grams of methanol (Fischer-Hepp rearrangement). The resulting reaction mixture was slurried with water and then extracted with dilute aqueous sodium hydroxide keeping the temperature below 30° C. The aqueous layer was withdrawn, neutralized with 80% sulfuric acid, cooled at 20° C. and the precipitate collected by filtration. A 40% yield of 4-isopropoxy-4'-nitrosodiphenylamine was obtained. This material was catalytically hydrogenated in ethanol solution at 125° C. and 200 p.s.i. of hydrogen using 5% palladium on carbon as catalyst. 4-isopropoxy-4'-aminodiphenylamine, boiling at 180–188° C. (0.8 mm.), was obtained in 66% yield. A sample was recrystallized from n-hexane; melting point 89–90° C.

Analysis. Calculated for $C_{15}H_{18}N_2O$: C, 74.35; H, 7.48; N, 11.56. Found: C, 73.80; H, 7.45; N, 10.95.

Into a 1-liter rocking autoclave were charged 60.5 grams of 4-isopropoxy-4'-aminodiphenylamine 70 ml. of acetone and 0.6 gram of 5% palladium on carbon. The contents while agitated were subjected to 200 p.s.i. of hydrogen at 130° C. for 3½ hours. The workup was similar to that used in the first example. The 4-isopropoxy-4'-isopropylaminodiphenylamine fraction boiling at 185° C. (0.4 mm.) was collected; the yield was 77%.

The new chemicals of the present invention may be used in rubber stocks in combination with other compounding ingredients, such as other antiozonants and antioxidants, waxes, vulcanizing agents, accelerators, activators, retarders, softeners and reinforcing agents.

*Example 6*

The compounds of this invention were evaluated for their antiozone activity in a modification of the test of A. D. Delman, B. B. Simms and A. R. Allison as described in Analytical Chemistry, vol. 26, 1589 (1954). In this test the ability of the compounds to retard the scission of rubber molecules in solution by ozone is determined by measuring the percent of initial viscosity of the polymer solution retained after successive periods of subjection to a regulated stream of ozone of constant concentration. It has been well demonstrated that there is a correlation between the results of this test and actual rubber tests taking into account such factors as the reactivity of the test compound with the other rubber compounding ingredients and volatility. In the modification of the test by which the compounds of this invention were evaluated, a solution of 1.25 grams of extracted SBR (copolymer of about 75 parts of butadiene and 25 parts of styrene) and 0.125 gram of test compound in 250 ml. of o-dichlorobenzene was ozonized at room temperature with a stream of air containing 250 p.p.m. of ozone by volume at a rate of 0.02 cubic meter per hour. The measurements of the viscosity of the solutions at 30° C. were made before the start of the ozonization and after each hour for 6 hours and from these data the percent of initial viscosity retained after each hour calculated. The results are given in the following table.

| Compound | Percent of Initial Viscosity Retained After— | | | | | |
|---|---|---|---|---|---|---|
| | 1 hr. | 2 hrs. | 3 hrs. | 4 hrs. | 5 hrs. | 6 hrs. |
| None (Control) | 36.1 | 17.2 | | | | |
| 4-ethoxy-4'-isopropylaminodiphenylamine | 95.4 | 87.9 | 76.3 | 59.5 | 37.6 | 19.1 |
| 4-ethoxy-4'-(4-methylpent-2-ylamino)diphenylamine | 93.0 | 83.0 | 68.4 | 46.8 | 26.9 | 14.0 |
| 4-ethoxy-4'-(2-octylamino)diphenylamine | 91.7 | 79.0 | 62.7 | 40.8 | 21.1 | |
| 4-isopropoxy-4'-isopropylaminodiphenylamine | 92.8 | 83.7 | 73.9 | 47.1 | 32.6 | 15.7 |

*Example 7*

This test shows the antioxidant properties of 4-isopropoxy-4'-isopropylaminodiphenylamine in vulcanized natural rubber. Test stocks were prepared according to the following recipes: Test Stock A (control) comprised 100 parts of natural rubber (smoked sheet), 45 parts of carbon black (HAF), 5 parts of pine tar, 5 parts of stearic acid, 0.1 part of xylenethiols (peptizer), 5 parts of zinc oxide, 0.5 part of N-cyclohexyl-2-benzothiazolesulfenamide (accelerator), and 2.5 parts of sulfur. Test Stock B was made from the recipe of test Stock A with the addition of 1.5 parts of 4-isopropoxy-4'-isopropylaminodiphenylamine.

The stocks were vulcanized for 45 minutes at 292° F.; the unaged tensile strengths of vulcanized stocks A and B were determined and also the tensile strengths after heat aging at 212° F. for 72 hours and the tensile strengths after oxygen aging under 300 pounds/sq. in. pressure of oxygen at 70° C. for 96 hours. The percent tensile strengths retained after such heat and oxygen aging were calculated from these tensile strength figures. Results are shown in the table below:

| Stock | Unaged tensile strength (p.s.i.) | Tensile strength after heat aging (p.s.i.) | Tensile strength retained after heat aging (percent) | Tensile strength after O₂ aging (p.s.i.) | Tensile strength retained after O₂ aging (percent) |
|---|---|---|---|---|---|
| A | 3,470 | 730 | 21 | 850 | 24.4 |
| B | 3,390 | 1,300 | 38.4 | 2,370 | 70 |

*Example 8*

This test shows the antiozonant properties of 4-methoxy-4'-isopropylaminodiphenylamine and 4-isopropoxy-4'-isopropylaminodiphenylamine in a synthetic rubber stock. Test Stock A (control) comprised 100 parts of SBR (copolymer of about 75 parts of butadiene and 25 parts of styrene), 3 parts of zinc oxide, 40 parts of carbon black (HAF), 10 parts of carbon black (EPC), 1.5 parts of stearic acid, 3.5 parts of naphthenic type oil softener, 3.5 parts of saturated polymerized petroleum hydrocarbon softener, 1.25 parts of N-cyclohexyl-2-benzothiazolesulfenamide, and 2 parts of sulfur. Test Stock B was made from the same recipe as test Stock A with the addition of 2.0 parts of 4-methoxy-4'-isopropylaminodiphenylamine. Test Stock C was made from the same receipe as test Stock A with the addition of 2.0 parts 4-isopropoxy-4'-isopropylaminodiphenylamine.

Specimens of Stocks A, B and C were cured for 45 minutes at 292° F. Specimens of unaged stocks and stocks which had been shelf aged for 6 and 14 months were looped according to Procedure B (Exposure of Looped Specimens) of ASTM test method D518–57T (Resistance to Surface Cracking of Stretched Rubber Compounds). The specimens were subjected to outdoor exposure on a roof at an angle of 45 degrees facing south. The exposure time before the test samples showed bad surface cracks was noted. The exposure time of the unaged Stocks A, B and C to reach the cracking stage was 73 days, 93 days, and 93 days, respectively. The exposure time of the Stocks A, B and C which were shelf aged for 6 months to reach the cracking stage was 3 days, 35 days and 122 days respectively. The exposure time of the Stocks A, B and C which were shelf aged for 14 months to reach the cracking stage was 6 days, 32 days and 93 days respectively.

*Example 9*

In this dynamic flexing test, the recipes for test Stocks A (control) B and C were the same as test Stocks A, B and C in Example 8. Unaged stocks and stocks shelf aged for 6 months and for 14 months were tested. In the dynamic flexing test used, molded stocks ½" x 6" x ¼" having a ⅛" radius circular groove across the center were cured for 45 minutes at 292° F. They were mounted outdoors facing south and flexed through a 78° angle at about 8.5 kilocycles per hour. The number of kilocycles before the test samples showed bad surface cracks was noted. For the unaged Stocks A, B and C the number was 2968, 6432 and 6432 kilocycles, respectively. For the Stocks A, B and C which had been shelf aged 6 months the number was 1769, 4612 and 4826 kilocycles, respectively. For Stock A which had been shelf aged 14 months the number was 2732 kilocycles. Stock B which had been shelf aged 14 months showed only slight cracks after 14,076 kilocycles, and Stock C which had been shelf aged 14 months showed only very slight cracks after 9,808 kilocycles.

*Example 10*

This test shows the superior ability of the chemicals of the present invention to resist the aging effects of heat and ozone. A comparison was made between the commercial antiozonant N,N'-di(5-methylhept-3-yl)-p-phenylenediamine, and the 4-isopropoxy-4'-isopropylaminodiphenylamine of the present invention. The test stocks were prepared according to the following recipes: Test Stock A (with a commercial antioxidant) comprised 150 parts of an SBR-carbon-black masterbatch (comprising 100 parts of a copolymer of about 75 parts of butadiene and 25 parts of styrene, and 50 parts of HAF carbon black), 2.5 parts of zinc oxide, 2 parts of zinc salts of coconut oil acids, 3 parts of naphthenic type oil softener, 7 parts of saturated polymerized petroleum hydrocarbon softener, 2 parts of sulfur, 1.5 parts of 2-mercaptobenzothiazole (accelerator), 0.2 part of diphenyl guanidine (accelerator), and 2 parts of the commercial antiozonant N,N'-di(5-methylhept - 3-yl)-p-phenylenediamine. Test Stock B was made from the recipe of test Stock A with the omission of the 2 parts of N,N'-di(5-methylhept-3-yl)-p-phenylenediamine and the inclusion of 2 parts of 4-isopropoxy-4'-isopropylaminodiphenylamine of the present invention.

Specimens of Stocks A and B were cured for 45 minutes at 292° F. Specimens of unaged stocks and stocks which had been heat aged for 70 hours at 212° F. were looped according to Procedure B (Exposure of Looped Specimens) of ASTM test method D518–57T (Resistance to Surface Cracking of Stretched Rubber Compounds). The specimens were exposed to air containing 50 parts per hundred million by volume of ozone in an ozone box at 40° C. for 8 hours and for 24 hours. The unaged Stocks A and B after being exposed to the ozone for 8 hours and for 24 hours showed no cracks. The heat-aged Stock A after 8 hours' exposure to the ozone was very, very slightly cracked and after 24 hours' exposure to the ozone was severely cracked (about 20% through the specimen). The heat aged Stock B after 8 hours' exposure to the ozone showed no cracks, and after 24 hours' exposure to the ozone was only very, very slightly cracked.

*Example 11*

This test shows the superior ability of the chemicals of the present invention to resist the aging effects of heat and outdoor weathering. A comparison was made between two commercial antiozonants N,N'-di(5-methylhept-3-yl)-p-phenylenediamine and 4-isopropylaminodiphenylamine, and the 4-isopropoxy-4'-isopropylaminodiphenylamine of the present invention. Test Stock A was made from the same recipe as test Stock A of Example 10. Test Stock B was made from the recipe of test Stock A of Example 10 with the omission of the 2 parts of N,N'-di(5-methylhept-3-yl)-p-phenylenediamine and the inclusion of 2 parts of the commercial antiozonant 4-isopropylaminodiphenylamine. Test Stock C was made from the recipe of test Stock A of Example 10 with the omission of the 2 parts of N,N'-(5-methylhept-3-yl)-p-phyenlenediamine and the inclusion of 2 parts of 4-isopropoxy-4'-isopropylaminodiphenylamine of the present invention.

Specimens of Stocks A, B and C were cured for 45 minutes at 292° F. Specimens of unaged stocks and stocks which had been heat aged for 70 hours at 212° F. were looped according to Procedure B (Exposure of Looped Specimens) of ASTM test method D518–57T (Resistance to Surface Cracking of Stretched Rubber Compounds). The specimens were subjected to outdoor exposure on a roof at an angle of 45 degrees facing south. The appearance of the unaged stocks and the appearance of the heat-aged stocks after various periods of exposure was noted. Unaged Stocks A, B and C showed no cracks after 227 days. After 22 days, heat-aged Stock A showed very slight cracking whereas Stocks B and C showed no cracks. After 42 days, Stock A showed cracks about 20% through the specimen, Stock B showed very slight cracking, and Stock C showed no cracks. After 117 days, Stock A showed cracks about 40% through the thickness of the specimen, Stock B showed cracks about 10% through the thickness of the specimen, and Stock C showed no cracks. After 219 days, Stock A showed cracks about 50% through the thickness of the specimen, Stock B showed cracks about 40% through the thickness of the specimen, and Stock C showed no cracks.

*Example 12*

This test shows the antioxidant properties of the chemicals of the present invention in edible fats and oils. 4-ethoxy-4'-isopropylaminodiphenylamine was tested as a fat antioxidant in the Swift Stability Test, also known as the Active Oxygen Method, described in Handbook of Food and Agriculture, edited by Fred C. Blanck, p. 244, Reinhold Publishing Corporation, New York (1955). Washed air was passed at the rate of 140 ml. per minute into a 20-ml. sample of lard, preheated to 98.2° C., containing 0.01% of the chemical of this invention. After 24 hours the peroxide value of the lard, determined by a standard iodometric procedure, was 5.92. Unprotected lard oxidized in the same manner had a peroxide value of 586.4.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A chemical compound represented by the formula

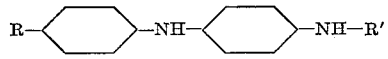

in which R is an alkoxy group having 1 to 4 carbon atoms and R' is a secondary alkyl group having 3 to 8 carbon atoms.

2. 4-methoxy-4'-isopropylaminodiphenylamine.
3. 4-ethoxy-4'-isopropylaminodiphenylamine.
4. 4-isopropoxy-4'-isopropylaminodiphenylamine.

References Cited by the Examiner

UNITED STATES PATENTS

| | | | |
|---|---|---|---|
| 2,503,778 | 4/1950 | Stone | 260—576 |
| 2,714,614 | 8/1955 | Weinmayr | 260—571 |
| 2,837,497 | 6/1958 | Delmonte | 260—47 |
| 2,938,922 | 5/1960 | Tung | 260—576 |
| 3,000,852 | 9/1961 | Merz | 260—45.9 |
| 3,098,841 | 7/1963 | Morris et al. | 260—45.9 |
| 3,126,412 | 3/1964 | Stahly | 260—577 |

CHARLES B. PARKER, *Primary Examiner.*

JOSEPH P. BRUST, LEON J. BERCOVITZ, *Examiners.*

ROBERT V. HINES, HOSEA E. TAYLOR, JR.,
*Assistant Examiners.*